United States Patent Office 2,737,500
Patented Mar. 6, 1956

2,737,500

PROCESS OF PRECIPITATING ANIONIC SUBSTANCES AND PRECIPITATED COMPOSITIONS

Ralph F. Nickerson, Marblehead, Mass., assignor to Monsanto Chemical Company, St. Louis, Mo., a corporation of Delaware No Drawing. Application November 30, 1950,
Serial No. 198,486

13 Claims. (Cl. 252—313)

The present invention relates to the precipitation of anionic substances which are colloidally dispersed or suspended in an aqueous medium or else have borderline solubilities in aqueous medium. The invention more particularly relates to the precipitation of silica from silica aquasols which are normally stable under alkaline conditions. This invention also relates to the redispersion of the precipitated material.

The precipitation of silica from an alkaline silica aquasol by acidification or by treatment with various bivalent inorganic metal salts has been described in the prior art. Various types of precipitates are obtained in this manner depending in most part on the method used in preparing the silica aquasol and the precipitating agent employed. Some precipitates are gels which resemble the gels obtained by acidifying sodium silicate with a mineral acid such as sulfuric acid. Other precipitates are gelatinous or slimy in nature and cannot be filtered or centrifuged. All of these precipitates, when dried, are non-dispersible in water solutions of alkali and do not form colloidal solutions therein.

In accordance with the present invention, it is possible to precipitate silica and other anionic colloidal or suspended materials or slightly water-soluble anionic materials and to dry the precipitated materials to form a product which is capable of being dipsersed in dilute alkaline aqueous solutions in the form of a comparatively stable sol or dispersion.

Silica aquasols and other anionic colloidal systems such as aqueous dispersions of thermoplastic resins as, for example, polystyrene and an anionic surface active agent are sold in commerce in the form of aqueous solutions or dispersions containing from about 15 to 50% solids depending on the dispersed phase in the aquasol or dispersion. The shipment of such aquasols or dispersions involves the transportation of considerable amounts of water which is undesirable from the standpoint of handling of the product, high freight charges and the bulkiness of the material being shipped. In accordance with the present invention it is possible to produce a dry silica or thermoplastic resin material or similar anionic substance which is readily dispersed in water solutions of alkali at the point of use, thus avoiding the necessity of shipping, storing and handling large quantities of water.

It is one object of this invention to precipitate anionic colloidal or dispersed substances or slightly water-soluble anionic substances, from an aqueous medium containing such substances, in the form of a precipitate which is readily separated from the aqueous medium and is readily redispersible in a water solution of an alkaline substance.

It is a further object of this invention to precipitate colloidal silica from silica aquasols in the form of a precipitate which is readily separated from the liquid phase and is colloidally dispersible in water solutions of an alkaline substance, particularly in water solutions of an alkali metal silicate or hydroxide to provide silica aquasol compositions having a comparatively high degree of stability.

It is a further object of this invention to provide a solid composition comprising an anionic substance, particularly silica, which is capable of being dispersed in water solutions of an alkaline substance, particularly water solutions of alkali metal hydroxides and alkali metal silicates, and of forming aqueous dispersions or solutions having a comparatively high degree of stability.

Still further objects and advantages of this invention will appear in the following description and the appended claims.

The objects of this invention are attained, in general, by contacting an aqueous dispersion of an anionic material which is colloidal or slightly soluble in water, as for example a silica aquasol, with an organic polycationic substance as, for example, gelatin at a pH sufficiently high to permit mixing of the anionic and polycationic substances without precipitation and then lowering the pH of the resulting mixture until the major portion of the anionic substance is precipitated from the aqueous medium in the form of a precipitate which is capable of being filtered or centrifuged, after which the precipitated material is removed from the supernatant liquid and is dried or allowed to dry. The precipitate is preferably washed with water prior to the drying step to remove water-soluble salts and other water-soluble substances from the precipitate. Depending upon the particular conditions and substances used it is possible to prepare dry precipitates which are dispersible in water solutions of alkaline substances such as water solutions of alkali metal hydroxides to provide dispersions or colloidal solutions having fair to good stability under alkaline conditions.

In carrying out the processes of this invention it is preferred to use an alkaline aqueous solution or dispersion or an alkaline aqueous colloidal solution of the anionic substance. Thus, in the case of silica aquasols, it is preferred to start with an alkaline silica aquasol, since the silica in such aquasol is in a stabilized form and is more susceptible to redispersion after it has been precipitated than is the case with the silica in an acidic silica aquasol. Moreover, where an alkaline solution, dispersion or sol of the anionic substance is used, it is possible to obtain an intimate mixture thereof with the organic polycationic substance, as for example, gelatin, without precipitating the anionic substance at this stage of the treatment. This is of importance from the standpoint of obtaining a precipitate which is uniform in character and hence uniformly dispersible in the aqueous solution of the alkaline substance.

As examples of aqueous solutions, dispersions or sols of anionic substances which are treated in accordance with the processes of this invention may be mentioned silica and other inorganic oxide aquasols; aqueous dispersions of an anionic surface active agent and a thermoplastic resin, for example, dispersions prepared by the emulsion polymerization in water of styrene, mixtures of styrene and a plasticizer, vinyl acetate, mixtures of vinyl chloride and vinyl acetate and the like, or water dispersions of plasticized polyvinyl butyral, polyvinyl formal and the like; water solutions or dispersions of slightly water-soluble compounds such as high molecular weight alkyl aryl alkali metal sulfonates having a long alkyl chain of 16 or more carbon atoms and the like. Other aqueous solutions, dispersions or sols of a similar nature may also be treated as described herein. Alkaline silica aquasols are the preferred starting materials in this class of substances.

Alkaline silica aquasols for use in the processes of the present invention are suitably prepared by the procedures described in the White Patent No. 2,375,738, granted May 8, 1945, the Di Maio Patent No. 2,515,949 or the Bird Patent No. 2,244,325. A preferred alkaline silica aquasol for the purposes of this invention is prepared by first reacting a mineral acid such as sulfuric acid with a water-soluble silicate such as sodium silicate until an acid reacting sol is obtained. The resulting sol soon sets up into a gel which is allowed to synerize and is then broken up into lumps and washed with water to remove electrolytes present in the gel. The washed lumps of gel are covered with a weak aqueous solution of a substance capable of forming hydroxyl ions, for example, sodium hydroxide. After the gel has absorbed the hydroxyl ions in the covering solution, it is separated from the excess solution and is heated, while avoiding the evaporation of water, until the major portion of the gel is converted to a sol. The sol is then separated from the unconverted gel. This process is described in greater detail in Example I, which appears hereinafter, and in the White patent referred to above.

The organic polycationic substance such as gelatin may be added directly to the aqueous solution, dispersion or sol of the anionic substance and dissolved therein or the organic polycationic substance may be dissolved in water and added to the aqueous solution or dispersion of the anionic substance in the form of an aqueous solution. The latter procedure is preferred. In such instances the water solution of the organic polycationic substance should preferably be substantially neutral or alkaline, that is, it preferably should have a pH between about 6.5 and 10.5.

The term "organic polycationic substance" as used herein is intended to include those organic compounds which have at least 2, and preferably 4 or more amino groups in the molecular unit and which are soluble in neutral or alkaline aqueous solutions. Organic polyamine compounds having such characteristics and which also have a molecular weight above 500 are preferred. The most suitable compounds are those which are soluble in water under acid, neutral and alkaline conditions and these are preferred above all other organic polycationic substances.

As examples of organic polycationic substances which are useful in carrying out the processes of this invention may be mentioned gelatin, including its various degraded forms which are soluble in water, casein, polyvinyl pyridine and the like. Gelatin is particularly preferred since it is soluble in acid, neutral and alkaline water solutions and provides a precipitate with the anionic substance which is readily dispersible in water solutions of alkaline substances. Other high or low molecular weight forms of gelatin may be used with silica aquasols but the high molecular weight gelatins are best suited for use with anionic substances such as the slightly water-soluble alkyl aryl alkali metal sulfonates. Zein and casein are not as suitable in this respect since these substances tend to precipitate from their water solutions on acidification, and redispersion of these substances with the anionic substance is likely to be difficult if care is not used in carrying out the acidification of such substances. Best results are obtained with zein and casein if the mixture of either of these substances with the anionic substance in an aqueous medium is acidified to a pH near or below the isoelectric point of either the zein or casein alone.

The concentrations of the anionic substance either in its own dispersion, sol or solution, or in relation to the organic polycationic substance may be varied considerably depending upon the particular anionic substance which is to be precipitated and the particular organic polycationic precipitant use. For example, where anionic silica is to be precipitated it is possible to start with a silica aquasol containing from 0.01 to 35% by weight of colloidal silica. Alkaline silica aquasols containing from about 1 to 20% by weight of colloidal silica are preferred.

The weight ratio of the organic polycationic substance to the anionic substance may be varied within quite wide limits particularly when a silica aquasol-gelatin mixture is used. Thus, it is possible to use from about 1 part by weight of gelatin solids for every 1 to 60 parts by weight of silica solids in the silica aquasol. If the weight ratio of gelatin to colloidal silica solids is too high, an appreciable amount of the gelatin is not co-precipitated with the silica on subsequent acidification of the mixture with the result that this amount of gelatin is lost on removal of the precipitate from the solution. Moreover, the large amount of gelatin in the precipitate may adversely affect the uses of the colloidal silica on redispersion. On the other hand, if the weight ratio of silica solids in the silica aquasol to the gelatin solids is too high, it becomes difficult to precipitate the silica in a readily filterable form and redispersion of the precipitate is also rendered difficult. For best results it is preferred to use 1 part by weight of gelatin with from 4 to 50 parts by weight of colloidal silica solids in the silica aquasol. When anionic substances other than colloidal silica and organic polycationic substances other than gelatin are used, the proportions of organic polycationic substance to the anionic substance are generally the same as in the gelatin-silica aquasol system discussed above.

The temperature of the aqueous mixture of anionic substance and organic polycationic substance may be varied considerably depending on the particular anionic substance or organic polycationic substance used. For example, when an alkaline silica aquasol is mixed with gelatin or a water solution of gelatin, the mixture may be maintained between about 5° C. and 100° C. In most instances the mixture is suitably formed and maintained within a temperature range of 20 to 40° C. and this temperature range is preferred for most purposes.

After the aqueous solution, dispersion or sol of the anionic substance, as for example an alkaline silica aquasol, is mixed with the organic polycationic substance such as gelatin as uniformly as possible, the mixture, which may be homogeneous, is acidified with an amount of a strong mineral or organic acid sufficient to precipitate the anionic substance. A substantial portion of the organic polycationic substance is co-precipitated with the anionic substance. The acidification is preferably carried out gradually and with vigorous agitation. The amount of acid required to effect precipitation will vary considerably depending on the particular acid used and the particular substances in the mixture which is being acidified. The amount of acid used should be sufficient to cause precipitation of a substantial amount, that is 60% or more, of the anionic substances. However, the amount of acid added preferably should not lower the pH of the mixture below 2.0.

The preferred class of acids for carrying out the acidification step are the mineral acids including sulfuric acid, hydrochloric acid, phosphoric acid and the like. Sulfuric acid and hydrochloric acid are particularly preferred. Strong organic acids, that is organic acids which are capable of lowering the pH of the mixture to about 3.0, are also useful. As examples of such acids may be mentioned formic and acetic acid.

The precipitates formed by the acidification of the mixture of the anionic substances and organic polycationic substances in the aqueous medium vary in their characteristics depending upon the particular substances present in the mixture. For example, the precipitates formed by the acidification of mixtures of proper proportions of gelatin and alkaline silica aquasols are generally curdy precipitates which are readily filtered or centrifuged and thus are readily separated from the liquid phase. They are also easy to wash and dry. With other anionic and organic polycationic substances it is possible to obtain flocculent to hard precipitates.

As pointed out previously, the precipitates, after filtration or centrifuging or separation in some other manner as by decantation, are preferably washed with water to remove electrolytes and other water-soluble substances. This is preferably done so that the precipitate will be readily dispersible in water solutions of alkaline substances. The presence of electrolytes interferes with redispersion in some instances as for example in colloidal silica-gelatin precipitates, particularly when the precipitates contain more than 1%, on the dry weight of the precipitate, of water-soluble electrolytes. However, washing of the precipitate with water is not necessary in all instances particularly when the concentration of electrolyte in the precipitate is less than 0.05%, on the weight of the dry precipitate.

The precipitates may be dried by known procedures, for example, by drum drying at temperatures of 60 to 90° C. Another suitable drying procedure consists in washing the precipitate with methyl alcohol or ethyl alcohol or some other low boiling water miscible organic liquid such as acetone to replace a substantial amount of the water in the precipitate. The resulting material is then air dried or dried at temperatures of about 50 to 100° C.

The precipitates whether in the wet or dry state comprise essentially a combination of the anionic substance, for example, colloidal silica and the organic polycationic substance, for example, gelatin. These substances are present in the precipitate in approximately the same proportions as they are present in the mixture before acidification and this is particularly true when the weight ratio of anionic substance to organic polycationic substance is high. In general, precipitates of colloidal silica and gelatin comprise from about 2 to 50 parts by weight of colloidal silica for each part by weight of gelatin.

The anionic substance is believed to be combined with the organic polycationic substance either by a weak chemical linkage such as salt-like bridges or by electronic or electrostatic charges as evidenced by the nature of the precipitate as contrasted to a precipitate of either starting substance alone and also in view of the fact that the co-precipitate is immediately formed at pH values which are usually insufficient to cause immediate precipitation of the anionic substance or the organic polycationic substance. For example, the acidification of a mixture of proper proportions of gelatin and an alkaline silica aquasol results in the immediate precipitation of a combination of colloidal silica and gelatin, whereas the alkaline silica aquasols do not precipitate or gel immediately after acidification and the gelatin per se does not precipitate at all from an acid solution. Moreover, the co-precipitate of colloidal silica and gelatin is curdy and readily filtered whereas gelatin does not precipitate when acidified and the acidification of silica aquasols results either in the formation of a gel or a slimy precipitate which cannot be filtered.

The mechanism of this chemical combination in the case of silica aquasols and gelatin is believed to be, generally, that the colloidal silica, which is a weakly anionic substance, reacts with the gelatin, which acts as a polycationic substance in an acid medium, to form a salt-like compound which is insoluble in an acidic aqueous solution and thus separates out as a precipitate. The colloidal silica is apparently held under acid conditions to the gelatin molecule at the amino groups therein by electronic or electrostatic forces with the result that the colloidal silica particles are unable to agglomerate as is the case when the gelatin is not present. This is also borne out by the fact that when the precipitate is stirred in an aqueous solution of alkali the silica particles are redispersed in the form of a colloid indicating that there has been no substantial agglomeration of the colloidal silica particles during acidification as is normally the case when gelatin is not used. Apparently also the gelatin does not act as a polycationic substance in an alkaline medium, since a precipitate is not formed under alkaline conditions. It is believed that this mechanism of reaction also applies to the other anionic substances and organic polycationic substances described herein. However, it is to be understood that the above mechanism of reaction is given by way of explanation, and it is not intended that the present invention be limited to the theory of reaction described herein.

As mentioned above, the co-precipitates of the anionic substance such as colloidal silica and the organic polycationic substance such as gelatin are dispersible in water solutions of alkaline substances. The resulting dispersions are stable for periods of several weeks to a year or more depending on the particular substances employed. For example, co-precipitates of colloidal silica and gelatin are dispersible in water solutions of alkaline substances in amounts of .01 to 15% by weight and form bluish opalescent colloidal solutions which are stable from 3 to 12 months depending on the alkaline substance present in the aqueous dispersing medium. It is preferred to use aqueous solutions containing an amount of alkaline substance sufficient to provide a final dispersion having a pH of 8.5 to 10.5 for dispersing the co-precipitate.

A large variety of alkaline substances may be used in the water dispersing medium for the redispersion of the co-precipitates of the anionic and organic polycationic substances. As examples of suitable alkaline substances may be mentioned alkali metal hydroxides such as sodium hydroxide; alkali metal silicates such as sodium silicate; ammonium hydroxide; and strong organic bases such as triethanolamine and trimethyl benzyl ammonium hydroxide and the like. Water solutions of the alkali metal hydroxides and silicates, particularly sodium hydroxide and sodium silicate, are preferred for the purpose of redispersing the co-precipitates of the anionic and organic polycationic substances.

The solution or sols of the redispersed co-precipitates are useful for the same purposes as the starting solutions or sol of the anionic substances. Thus, a solution of redispersed colloidal silica and gelatin is suitable for the treatment of textile fibers to increase the slip resistance of the fibers and for the treatment of textile fabrics to increase the slip resistance of the textile yarns in the fabrics. The redispersed co-precipitates of colloidal silica and gelatin are also useful for the treatment of paper to improve the tear strength of the paper. The redispersed long chain alkyl aryl metal sulfonates may be used as wetting agents and the redispersed thermoplastic resins may be used for the same purposes as the original thermoplastic resin dispersions from which the co-precipitates are formed.

In addition to the preparation of redispersible co-precipitates as described herein, the processes of this invention may be used generally to remove small amounts of anionic substances, of the type described, from dilute solutions or sols of such anionic substances where recovery by evaporation would be uneconomical; or the processes described herein may be used to concentrate suitable anionic substances in an aqueous medium where heat could not be used for that purpose or to effect removal of salts from the solution or dispersion of the anionic substance by precipitating the anionic substance as hereinbefore described and then separating and washing and redispersing the co-precipitate. Other uses for the processes described herein will be apparent to those skilled in the art to which this invention appertains. The gelatin in the redispersed solution or sol may be removed if desired by precipitation with a gelatin precipitant such as tannic acid.

A further understanding of the products and processes of this invention will be obtained from the following specific examples which are intended to illustrate such products and processes, but are not intended to limit the scope of the invention, parts and percentages being by weight.

*Example 1*

An alkaline silica aquasol was first prepared as follows:
Seventy-three parts of 66° Bé. $H_2SO_4$ were diluted with 358 parts of water and charged to a mixing tank. Four hundred and seventy-two parts of an aqueous sodium silicate solution analyzing 8.9% $Na_2O$ and 29% $SiO_2$ were diluted with 377 parts of water. The silicate solution was added with stirring to the acid solution. The resulting mixture set up as a gel in a few minutes after the mixing was completed. After the gel had aged for 16 hours the syneresis liquor was drained off and the gel was crushed to one-inch lumps. The gel lumps were washed with a continuous flow of water for 16 hours and were then covered with 750 parts of water containing 0.9 part of NaOH. After standing for 6 hours the solution was drained off and a portion of the gel lumps were charged to an autoclave equipped with a steam jacket. The gel was heated for 4 hours, using steam at 215 pounds per square inch absolute pressure in the jacket of the autoclave. The contents of the autoclave were then blown out and the residual undispersed gel was removed from the resulting sol by centrifuging. The sol thus produced contained about 12.5% $SiO_2$ and had a pH of about 9.5 (measured by a glass electrode). This sol was then concentrated by heating on a water bath, with stirring, until the sol contained 32% silica.

Twelve and five-tenths parts of the 32% silica aquasol as prepared immediately above were added to 20 parts of a neutral 5% water solution of U. S. P. gelatin. The resulting mixture was agitated until a homogeneous solution was obtained. The resulting solution contained 4 parts of dry silica solids for each part of dry gelatin solids. After the solution was stirred thoroughly, acetic acid was added in an amount sufficient to lower the pH of the solution to 4.5. A curdy precipitate formed immediately and settled out of the solution leaving a clear, supernatant liquid above the precipitate. The precipitate was separated from the liquid phase by filtration and was then washed three times with water to remove water-soluble electrolytes, primarily sodium acetate and sodium sulfate. The precipitate was finally washed with methanol and was then allowed to air dry to a constant weight. The dry precipitate was a white brittle solid which was readily comminutable to a white powder. The powder contained about 4 parts of colloidal silica for each part of gelatin.

About 10 parts of the dry powder were agitated in 90 parts of cold water containing an amount of sodium hydroxide sufficient to provide a dispersion having a pH of 9.5 (glass electrode). These ingredients were allowed to stand for about 10 minutes to allow the gelatin in the product to swell in the water, after which they were agitated vigorously until a blue opalescent colloidal solution was obtained. This colloidal solution was stable for at least 6 months.

The starting alkaline silica aquasol when acidified with acetic acid to a pH of 4.5 in the absence of gelatin formed a soft, highly gelatinous, non-filterable precipitate after standing for a considerable period of time.

*Example II*

The alkaline silica aquasol containing 12.5% silica solids prepared as described in the first paragraph of Example I was concentrated on a water bath until it contained 15% silica solids. Thirty-three hundred and thirty-two milliliters of water were added to 3333 milliliters of the above 15% silica aquasol with stirring, after which 666 milliliters of a neutral 5% water solution of U. S. P. gelatin were added with stirring. After a homogeneous solution was obtained, 200 milliliters of 0.1 N water-solution of hydrochloric acid were added and the resulting mixture was stirred vigorously during and after the addition of the acid solution. A curdy co-precipitate of colloidal silica and gelatin was formed almost immediately concurrent with the addition of the acid. This precipitate was readily separated from the supernatant liquid by filtering with suction. The separated precipitate was washed three times with methanol and was allowed to dry at room temperature to a constant weight. The dry product contained about 50 parts of dry colloidal silica for each part of dry gelatin. The dry, white brittle precipitate was ground to a white powder. Five parts of this powder were added to 95 parts of cold water containing sufficient sodium hydroxide to provide a final dispersion having a pH of 10.0, and the resulting mixture was allowed to stand 10 minutes to swell the gelatin. The mixture was then agitated and a bluish opalescent colloidal solution having excellent stability was formed.

The starting alkaline silica aquasol when acidified with hydrochloric acid in the absence of gelatin formed a soft, highly gelatinous, non-filterable precipitate after standing for a considerable period of time.

Various modifications and changes in the products and processes described herein may be made by those skilled in the art to which this invention appertains without departing from the spirit and intent of the present invention. Accordingly, it is intended that this invention should not be limited except by the scope of the appended claims.

What is claimed is:

1. A process of precipitating colloidal silica which consists in the steps of admixing under alkaline conditions an alkaline silica aquasol and a substance selected from the group consisting of gelatin, casein and polyvinyl pyridine, which substance is soluble in neutral and alkaline water solutions, until a uniform mixture is obtained, said substance being employed in the proportion of 1 part by weight thereof for every 1 to 60 parts by weight of silica solids in said aquasol, adding a strong acid in an amount sufficient to co-precipitate said substance and the colloidal silica in said aquasol, thereby forming a precipitate which settles out of solution, and separating the precipitate from the liquid phase.

2. A process of preparing colloidal silica compositions which are dispersible in water solutions of alkaline substances which consists in the steps of admixing under alkaline conditions an alkaline silica aquasol and a substance selected from the group consisting of gelatin, casein and polyvinyl pyridine, which substance is soluble in neutral and alkaline water solutions, until a uniform mixture is obtained, such substance being employed in the proportion of 1 part by weight thereof for every 1 to 60 parts by weight of silica solids in said aquasol, adding a strong acid which is capable of lowering the pH of the resulting mixture to 3.0, said acid being added in an amount sufficient to co-precipitate said substance and the colloidal silica in said aquasol, thereby forming a precipitate which settles out of solution, separating the precipitate from the liquid phase, washing the precipitate substantially free of water-soluble electrolytes and drying the precipitate.

3. A process of preparing compositions which are dispersible in water solutions of alkaline substances which consists in the steps of admixing gelatin which is soluble in acid, neutral and alkaline aqueous solutions with an alkaline silica aquasol under alkaline conditions until a uniform mixture is obtained, said gelatin being employed in the proportion of 1 part by weight thereof for each 1 to 60 parts by weight of silica solids in said aquasol, adding a strong acid which is capable of lowering the pH of the resulting mixture to 3.0, said acid being added in an amount sufficient to co-precipitate said gelatin and the colloidal silica in said aquasol, separating the precipitated material from the liquid phase, washing the precipitated material substantially free of water-soluble electrolytes and drying the precipitate.

4. A process of preparing compositions which are dispersible in water solutions of alkaline substances which consists in the steps of admixing gelatin which is soluble in acid, neutral and alkaline aqueous solutions with an alkaline silica aquasol containing from 0.01 to 35% by weight of colloidal silica under alkaline conditions until a uniform mixture is obtained, said gelatin and silica aquasol being employed in a weight ratio of 1 part by weight of gelatin to from 1 to 60 parts by weight of colloidal silica in said aquasol, adding a mineral acid to the resulting mixture in an amount sufficient to co-precipitate said gelatin and the colloidal silica in said aquasol, separating the precipitated material from the liquid phase, washing the precipitated material substantially free of water soluble electrolyte and drying the precipitate.

5. A process according to claim 4, but further characterized in that the mineral acid is hydrochloric acid.

6. A process according to claim 4, but further characterized in that the mineral acid is sulfuric acid.

7. A process of preparing compositions which are dispersible in water solutions of alkaline substances which consists in the steps of admixing gelatin which is soluble in acid, neutral and alkaline solutions with an alkaline silica aquasol containing from 0.01 to 35% by weight of colloidal silica under alkaline conditions until a uniform mixture is obtained, said gelatin and silica aquasol being employed in a weight ratio of 1 part by weight of gelatin to from 1 to 60 parts by weight of colloidal silica in said aquasol, adding a strong organic acid which is capable of lowering the pH of the resulting mixture to 3.0, said acid being added in an amount sufficient to co-precipitate said gelatin and the colloidal silica in said aquasol, separating the precipitated material from the liquid phase, washing the precipitated material substantially free of water-soluble electrolytes and drying the precipitate.

8. A process according to claim 7, but further characterized in that the organic acid is acetic acid.

9. A process according to claim 7, but further characterized in that the organic acid is formic acid.

10. A process of preparing compositions which are dispersible in water solutions of alkaline substances at a pH of 8.5 to 10.5 which consists in the steps of admixing a water solution of gelatin with an alkaline silica aquasol containing from 1 to 20% by weight of colloidal silica under alkaline conditions until a homogeneous solution is obtained, said gelatin solution and silica aquasol being employed in a weight ratio of 1 part by weight of gelatin solids to from 4 to 50 parts by weight of colloidal silica solids in said aquasol, adding a mineral acid in an amount sufficient to co-precipitate said gelatin and the colloidal silica in said aquasol but insufficient to lower the pH below 2.0, separating the precipitated material from the liquid phase, washing said precipitated material substantially free of water-soluble electrolytes and drying the precipitate.

11. A process of preparing colloidal solutions of silica which consists in the steps of admixing gelatin which is soluble in acid, neutral and alkaline aqueous solutions with an alkaline silica aquasol under alkaline conditions until a uniform mixture is obtained, said gelatin being employed in the proportion of 1 part by weight thereof to every 4 to 50 parts by weight of silica solids in said aquasol, adding a strong acid which is capable of lowering the pH of the resulting mixture to 3.0, said acid being added in an amount sufficient to co-precipitate said gelatin and the colloidal silica in said aquasol, separating the precipitated material from the liquid phase, washing the precipitated material substantially free of water-soluble electrolytes and dispersing the precipitated material in an aqueous solution of an alkaline substance, said alkaline substance being present in an amount sufficient to provide a final colloidal silica solution having a pH of about 8.5 to 10.5.

12. A process according to claim 11, but further characterized in that the alkaline substance is an alkali metal hydroxide.

13. A process according to claim 11, but further characterized in that the alkaline substance is an alkali metal silicate.

References Cited in the file of this patent

UNITED STATES PATENTS

| | | |
|---|---|---|
| 1,658,289 | Heidlberg | Feb. 7, 1928 |
| 2,010,012 | Collins | Aug. 6, 1935 |
| 2,340,358 | Young | Feb. 1, 1944 |
| 2,527,261 | Hart et al. | Oct. 24, 1950 |

OTHER REFERENCES

Lesley: Trans. Farraday Soc., vol. 25, pp. 570–9 (1929).